United States Patent
Iacona

(10) Patent No.: US 7,257,898 B2
(45) Date of Patent: Aug. 21, 2007

(54) CUTTING HEAD FOR STRING TRIMMER

(75) Inventor: Fernando R. Iacona, Scottsdale, AZ (US)

(73) Assignee: Kwik Products, Inc., Phoenix, AZ (US)

( * ) Notice: Subject to any disclaimer, the term of this patent is extended or adjusted under 35 U.S.C. 154(b) by 366 days.

(21) Appl. No.: 11/086,082

(22) Filed: Mar. 22, 2005

(65) Prior Publication Data
US 2005/0229402 A1    Oct. 20, 2005

Related U.S. Application Data

(60) Provisional application No. 60/562,844, filed on Apr. 16, 2004.

(51) Int. Cl.
*A01D 34/73* (2006.01)
(52) U.S. Cl. .......................................... 30/276; 56/12.7
(58) Field of Classification Search ................. 30/276, 30/277.4; 56/12.7
See application file for complete search history.

(56) References Cited

U.S. PATENT DOCUMENTS

| 3,708,967 A |   | 1/1973 | Geist et al. | |
| 4,035,912 A | * | 7/1977 | Ballas et al. | 30/276 |
| 4,374,465 A | * | 2/1983 | Comer | 56/12.7 |
| 4,513,563 A | * | 4/1985 | Roser et al. | 56/295 |
| 4,852,258 A |   | 8/1989 | Foster | |
| 5,758,424 A |   | 6/1998 | Iacona et al. | |
| 5,791,054 A | * | 8/1998 | Bessinger | 30/276 |
| 5,896,666 A |   | 4/1999 | Iacona et al. | |
| 5,970,693 A | * | 10/1999 | Ciaglo | 56/12.7 |
| 6,119,350 A | * | 9/2000 | Sutliff et al. | 30/276 |
| 6,681,865 B2 | * | 1/2004 | Pace | 172/111 |
| 2006/0179663 A1 | * | 8/2006 | Harris | 30/276 |

FOREIGN PATENT DOCUMENTS

EP          0 824 854 A2    2/1998

* cited by examiner

*Primary Examiner*—Kenneth E. Peterson
(74) *Attorney, Agent, or Firm*—Anthony J. Casella; Gerald E. Hespos

(57) ABSTRACT

A cutting head for a string trimmer is provided which accommodates any string gauge thickness and may be easily and quickly re-threaded upon failure of a string previously disposed therein. The cutting head has spring-biased clamping members which are each mounted within a rotatable clamp housing within the head, such that, as a string encounters a solid object, the clamping member and its associated housing are rotated about a generally vertical axis so as to obviate or minimize the development of a stress concentration in the string in the vicinity at which it is engaged by the clamp housing.

10 Claims, 6 Drawing Sheets

CUTTING HEAD FOR STRING TRIMMER

This application claims priority from U.S. Provisional Application No. 60/562,844, filed Apr. 16, 2004, which is incorporated herein by reference.

BACKGROUND OF THE INVENTION

This invention is directed to garden string trimmers and, more particularly, to a cutting head for string trimmers which can be easily re-strung, and which is designed to minimize breakage of the strings when encountering solid objects.

String trimmers are most often used to cut vegetation along a border of a flower bed or plot of grass which is adjacent to a sidewalk, driveway or other solid structure. Since the cutting head rotates at a speed that makes the strings nearly imperceptible, an operator of the string trimmer is not always able to see that the strings may come into contact with a hard surface and react accordingly. As a result, strings on a string trimmer are commonly broken. Prior art designs of string trimmer cutting heads have attempted to ease the re-stringing process which may be quite time consuming.

One type of prior art cutter head design is generally known as a weave-type head. The latter usually includes an array of grooves and cut-outs in the hub of the cutting head which act to anchor a string therein. An example of this type of cutter head design is disclosed in U.S. Pat. No. 4,190,954 to Walto entitled "Cutting Head" which issued Mar. 4, 1980. This type of cutting head has several drawbacks. First, the grooves and cut-outs include a number of sharp corners which, in time, fray, weaken and break the string disposed therein. Second, a relatively thin string can only be used due to the numerous twists and turns the string must pass through to anchor the string to the cutter head. Third, disassembly of the weave-type cutting head is required to re-string the cutter head with subsequent bending and manipulation of the strings to conform with the grooves and cut-outs formed therein.

A second type of string trimmer cutting head design is generally known as a tap-and-go head. The latter includes a spool of string enclosed within the cutting head, where the string is paid out through peripheral apertures formed in the circumference of the cutting head as required, when the head is tapped against the ground. An example of this type of string trimmer cutting head design is disclosed in U.S. Pat. No. 3,708,967 to Geist, et al. entitled "Rotary Cutting Assembly" which issued on Jan. 9, 1973. This cutting head design also has several drawbacks. A failure near an aperture may cause the end of the string to retract within the cutting head, thus requiring disassembly of the cutter head and re-threading of the string through the aperture. Also, the operator of the string trimmer must carry the weight of an entire spool, including about twenty feet of string, during the course of operation, which for a commercial gardener may be a substantial time and even an entire work day, resulting in a strenuous effort.

The shortcomings of the prior art string trimmer cutting head designs have been overcome by the inventor of the subject invention in a new and improved head for string trimmer which is disclosed in the subject inventor's prior U.S. Pat. No. 5,758,424 which issued on Aug. 23, 1996 and U.S. Pat. No. 5,896,666 which issued on Apr. 27, 1999, both of which patents are entitled "Head for String Trimmer".

In applicant's above-mentioned U.S. patents, a cutting head for a string trimmer is provided which accommodates discrete lengths of string of any gauge thickness and which may be easily and quickly re-threaded upon failure of a string previously disposed therein. Spring-biased clamping members are provided to clamp the strings within the cutter head, with the clamping force being provided by the springs and possibly supplemented by centrifugally generated force moments. The teachings of applicant's U.S. Pat. Nos. 5,758,424 and 5,896,666 are incorporated in their entirety herein by reference.

As illustrated in FIGS. 1-3 of U.S. Pat. No. 5,896,666, applicant's cutting head design includes a substantially cylindrical body having a disc-shaped base plate formed to define a central drive shaft aperture and a surrounding side wall. A plurality of slots are formed in the side wall with a radially inward extending pressing wall forming one edge of each of the slots. A spring-biased clamping member is pivotally mounted adjacent each aperture, opposite the corresponding pressing wall so that its center of gravity is disposed between the pivotal mounting and the corresponding pressing wall.

The spring-biased clamping members of U.S. Pat. No. 5,896,666 are adapted and formed to generate two degrees of clamping force in cooperation with the corresponding pressing walls. Each spring is provided to generate one degree of clamping force, wherein the clamping force is sufficient to grippingly engage and maintain strings within the cutting head. A second supplemental clamping force is generated with the clamping head being in use in that the rotation of the cutting head creates centrifugal force that acts on the center of gravity of the clamping members and enhances the gripping force thereof.

The spring-biased clamping force of the cutter head of U.S. Pat. No. 5,896,666 is overcome by a string being forcibly introduced from a location outside the cutting head, through the aperture and between the clamping member and the pressing wall, and into the central volume of the head. During operation, the clamping members are rigidly locked into a clamping position from which the supplemental clamping force is generated. Since the discrete strings are threaded through the apertures from a location outside the cutting head, no time-consuming disassembly of the cutting head is required to re-string the cutting head upon failure of a string. An operator of the cutting device, as disclosed in U.S. Pat. Nos. 5,758,424 and 5,896,666, may carry a bundle of strings pre-cut to a pre-determined length which can be easily threaded into the cutting head as needed.

Notwithstanding the outstanding results and efficiencies obtained using the cutting head of U.S. Pat. Nos. 5,758,424 and 5,896,666, depending on the physical characteristics of the string used with the cutting head, stress concentrations may develop at the point where the string is captured within the cutting head (i.e., where the spring-biased clamping member engages the string) as the string contacts a solid object. Repeated stress concentrations could result in the premature breaking of the string.

It is an object of the subject invention to provide a new and improved cutter head which includes means for minimizing or obviating the development of stress concentrations in the vicinity at which the clamping member engages the string when the string contacts a solid object.

It is also an object of this invention to provide a string trimmer cutter head which can be easily and quickly strung with any gauge string of discrete length.

It is yet another object of this invention to provide a lightweight string trimmer cutter head which contains an amount of string needed only for operation.

It is a further object of this invention to provide a string trimmer cutter head which can be re-strung without disassembly or bending and twisting of the string within the cutting head.

SUMMARY OF THE INVENTION

The above-stated objects are met by a new and improved string trimmer cutting head which can be easily and quickly re-strung and is capable of using thin, as well as thick, gauge string.

The subject invention achieves the above objectives by providing, as in the case of applicant's prior U.S. Pat. Nos. 5,758,424 and 5,896,666, a cutting head with spring-biased clamping members which are each mounted within a rotatable housing within the head, such that, as the string encounters a solid object, the clamping member and its associated rotatable housing are rotated about a generally vertical axis so as to obviate or minimize the development of a stress concentration in the string in the vicinity at which it is engaged by the clamping member. The spring-biased clamping members may be pivotally or slidably mounted within the associated rotatable housings.

DETAILED DESCRIPTION OF THE INVENTION

Referring to FIGS. 1-4, the cutter head of the subject invention is generally designated by the numeral 10, and is shown with cutting lines or strings 12 extending from the cutter head. Cutting string 12 usually is made of a plastic material, while the cutter head 10 may be made of metal or plastic.

Figure 1:
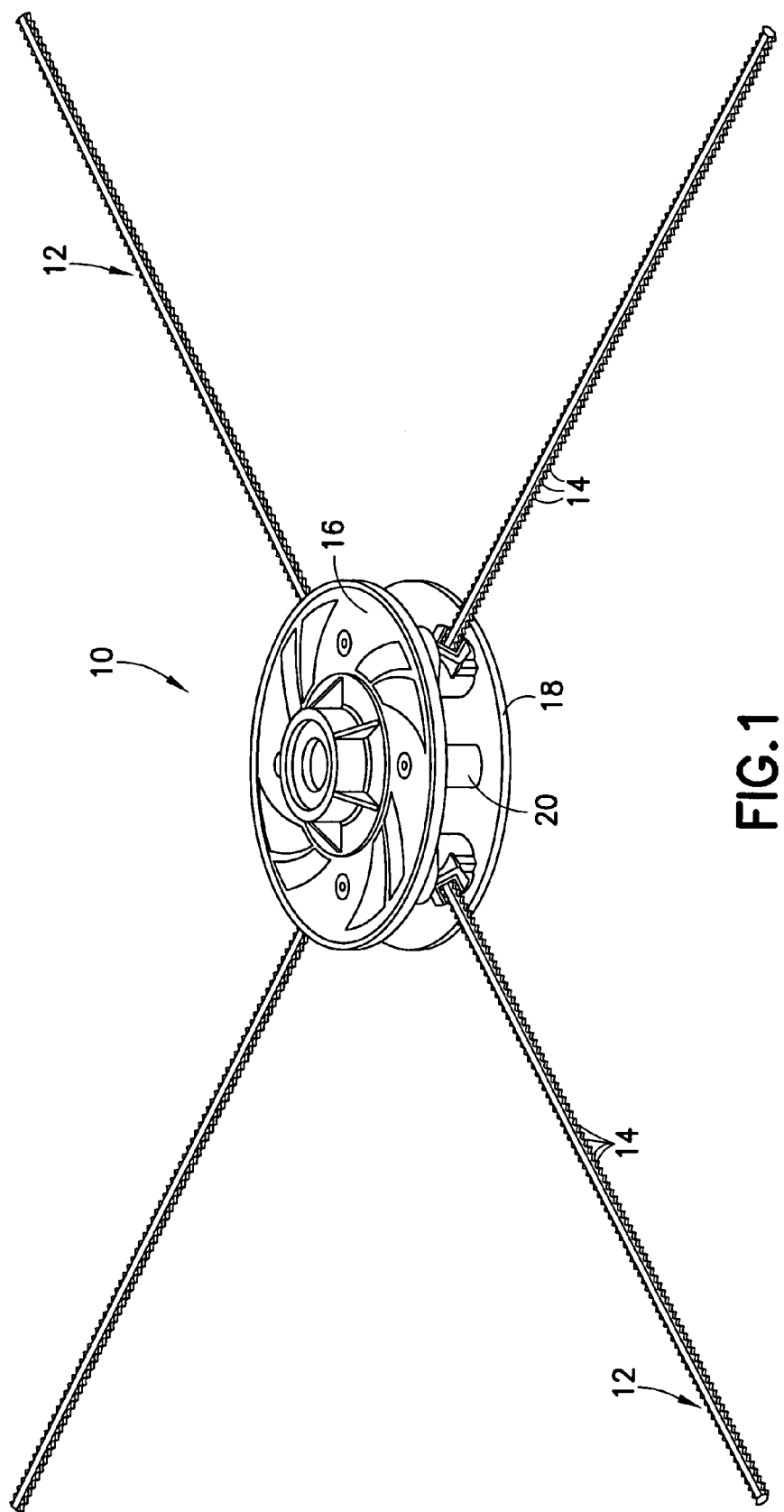
FIG. 1 is a perspective view of the cutting head of the subject invention with four cutting lines inserted into the cutting head.
Figure 2:
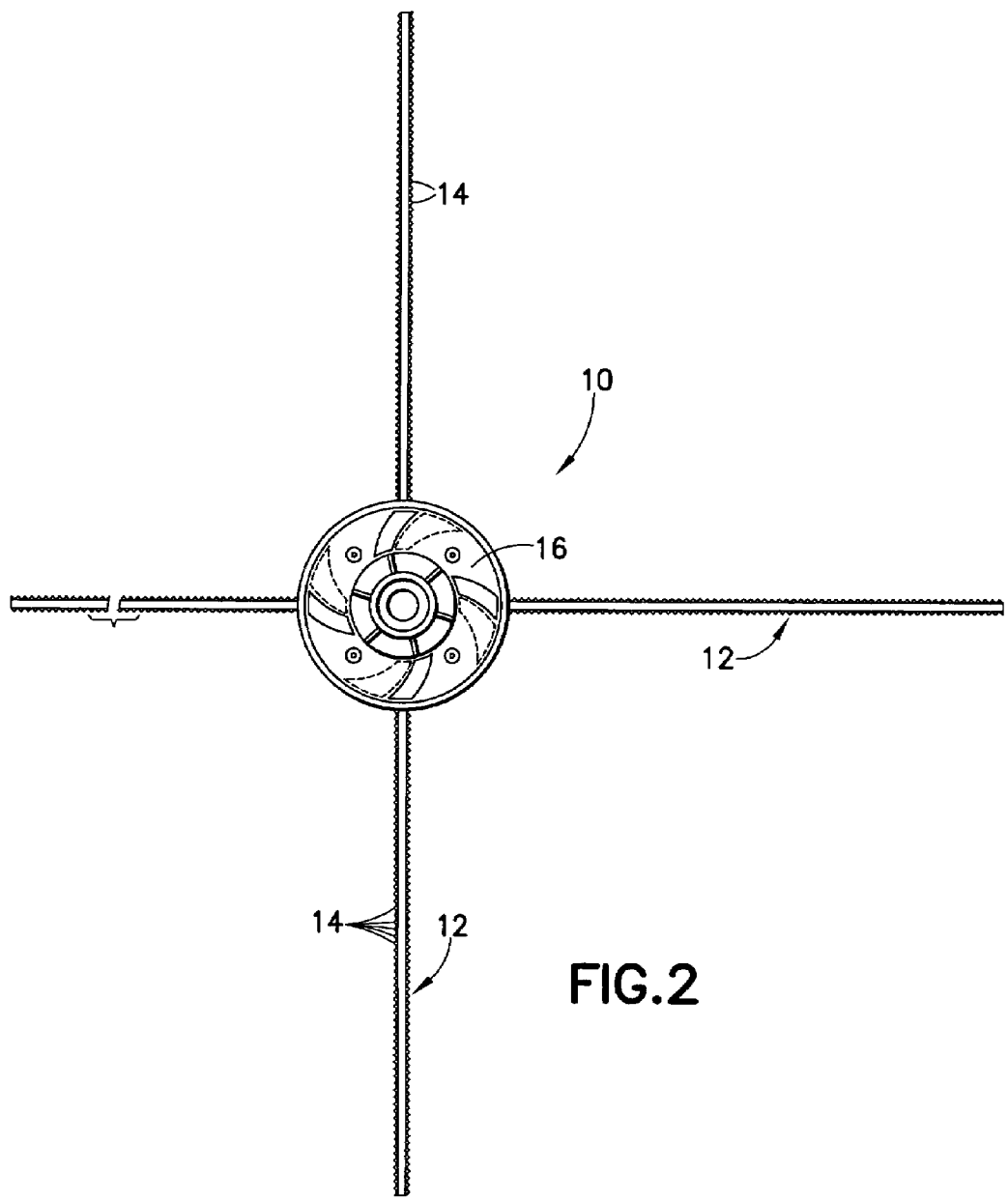
FIG. 2 is a top plan view of the cutting head of FIG. 1.

As shown in FIGS. 1 and 2, each string 12 is of a discrete length, on the order of eight inches, and is generally diamond-shaped in cross-section and includes ridges 14 extending along the length thereof. Each diamond-shaped string 12 is mounted within the cutter head 10 so that a ridged edge 14 of the string engages the vegetation to be trimmed and effectively saws the vegetation. Alternatively, the string 12 may be of circular cross-section and may be various diameters, depending upon the type of vegetation to be cut.

Figure 3:
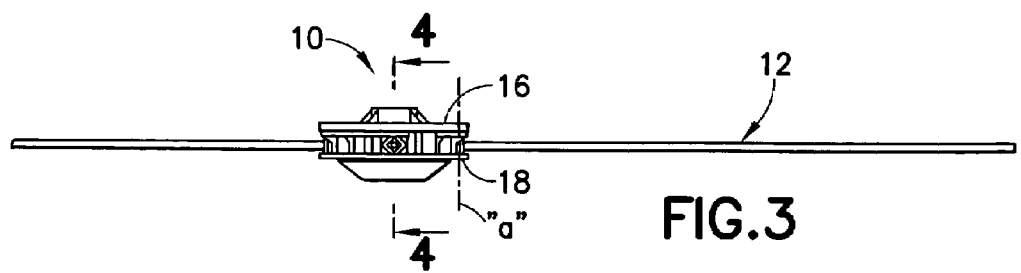
FIG. 3 is a side elevational view of the cutting head and strings of FIG. 1.

As shown in FIGS. 1-3, the cutter head 10 includes upper cover 16, lower cover 18, and a plurality of posts 20 which are fixedly connected to and maintain the spacing between the upper and lower covers 16, 18.

Each discrete length of string 12 is selectively fixedly connected to the cutter head 10 by a rotatable clamp housing 22. As illustrated in FIG. 1, each rotatable clamping structure 22 is uniformly spaced about the periphery of the cutting head 10, intermediate the posts 20.

Each rotatable clamp housing 22 is rotatable about an axis, designated "a", extending perpendicular to or generally vertical to the upper and lower covers 16, 18. By virtue of the rotation of the clamp housings 22, should a string 12 contact a rigid structure during the operation of the cutting head, the respective clamp housing 22 will rotate about axis "a", thereby obviating or minimizing the development of a stress concentration in the cutting string adjacent the connection of the cutting string 12 to the respective clamp housing 22. When the cutting head 10 is rotating at operational speed, the centrifugal force action on each string 12 will maintain the string in the positions as shown in FIGS. 1 and 2, until such time as the string encounters a rigid object, at which time the clamp housing 22 will rotate.

As more fully described hereinafter, disposed within each rotatable clamp housing 22 is a spring-biased clamping member of the type disclosed in applicant's U.S. Pat. Nos. 5,758,424 and 5,896,666. Each spring-biased clamping member disposed within a clamp housing 22 is adapted and formed to generate two degrees of clamping force. First, the cam of the clamping member is spring-biased to generate a clamping force which is sufficient to grippingly engage and maintain the string 12 within the rotatable clamp housing 22. Depending on the design of the cam of the clamping member, a supplemental clamping force may be generated when the cutting head is rotated at operational speed. More particularly, rotation of the cutting head 10 may create a centrifugal force that acts on the center of gravity of the respective cam of the clamping member and thus enhances the gripping force of the clamping member on the string. The cam structure within the clamping member may be pivotally mounted or slidably mounted within the clamp housing 22, as more fully described hereinafter.

Figure 10:
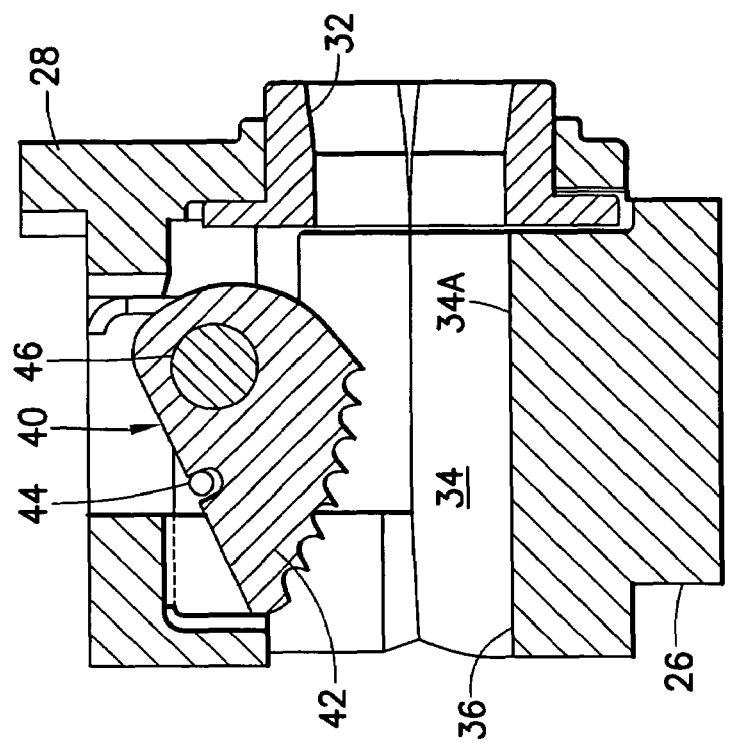
FIG. 10 is a cross-sectional view of the rotatable housing taken along lines 10-10 in FIG. 9.
Figure 9:
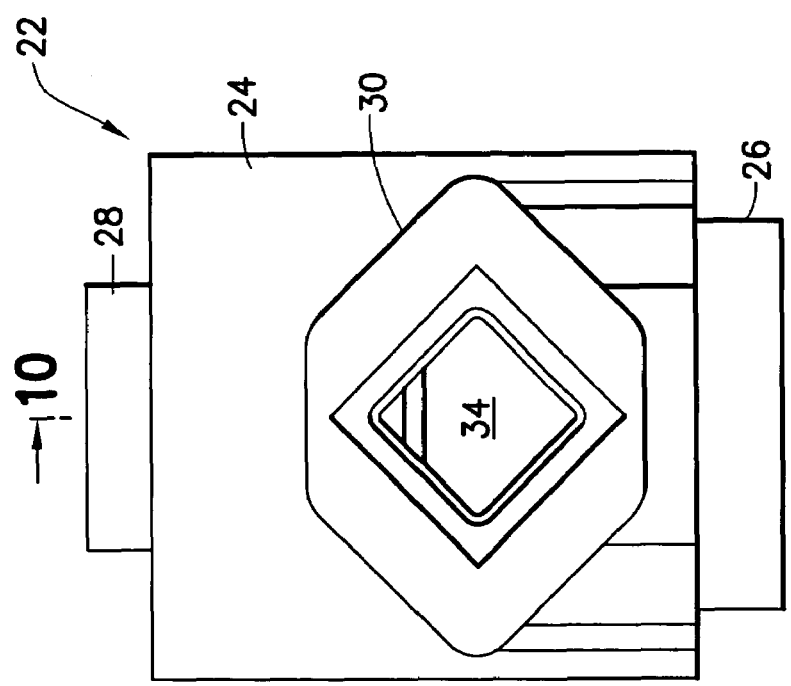
FIG. 9 is a front elevational view of the rotatable housing of FIG. 5.

FIGS. 5-10 illustrate various views of a rotatable clamp housing 22, with FIG. 10 being a cross-sectional view of the rotatable clamp housing 22. The latter includes a generally cylindrically shaped housing 24, the lower end of which includes a circular support portion 26 of smaller diameter than the cylindrically shaped housing 24. Extending from the upper end of the cylindrically shaped housing 24 is a curved tang 28 which provides a stop for limiting the amount of angular rotation of the rotatable clamp housing 22 about the axis "a" within the cutter head 10.

At the front portion of each rotatable clamp housing 22 is a protrusion 30 including a diamond-shaped opening 32 leading to a passageway 34 which extends completely through the housing 24 for receiving a string 12.

As illustrated in FIG. 10, the passageway 34 extends through the housing 24 to the rear opening 36 in order to allow the through passage of the string 12.

Figure 7:
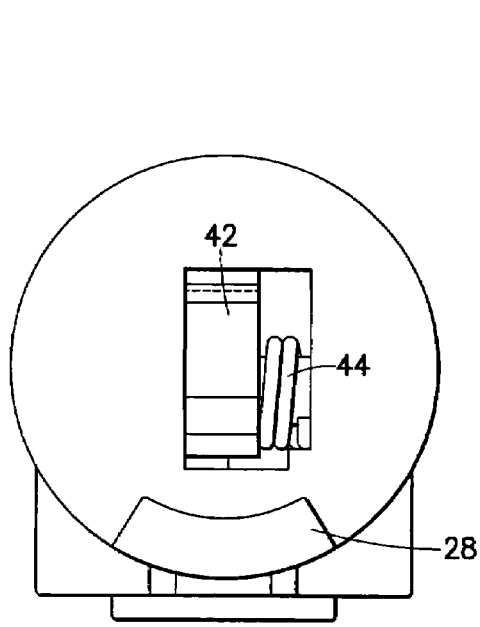
FIG. 7 is a top plan view of the rotatable housing of FIG. 5.
Figure 8:
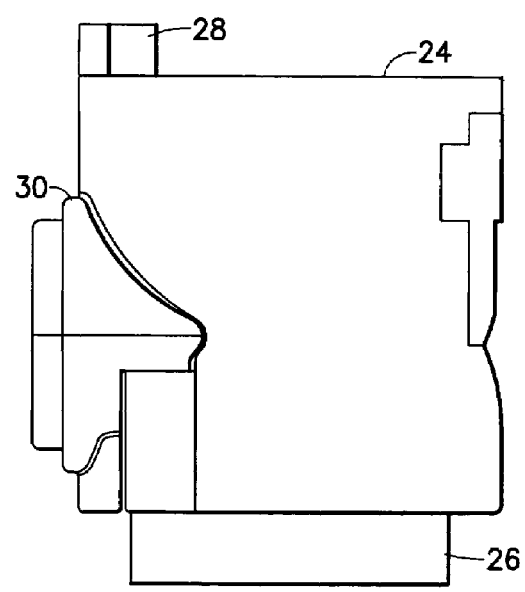
FIG. 8 is a side elevational view of the rotatable housing of FIG. 5.

Referring to FIGS. 7 and 10, disposed within each rotatable clamp housing 22 is a clamping member 40 of the type disclosed in applicant's U.S. Pat. Nos. 5,758,424 and 5,896,666, with the cam 42 of said clamping member 40 being spring-biased by torsion spring 44 and being disposed within the rotatable clamp housing 22. As shown in FIG. 10, the pivot axis 46 of the cam 42 is orthogonal to the rotatable axis "a" of the rotatable clamp housing 22. As shown in FIGS. 7 and 10, the spring 44 is of the torsion type, although various other types of springs may be utilized in order to provide the spring-biased force of the cam 42 against the string 12.

During operation of the cutter head, as the cutter head 10 is rotating at high speed, the spring-biased cam 42 clamps the cutting line 12 to the cutter head 10.

Figure 4:
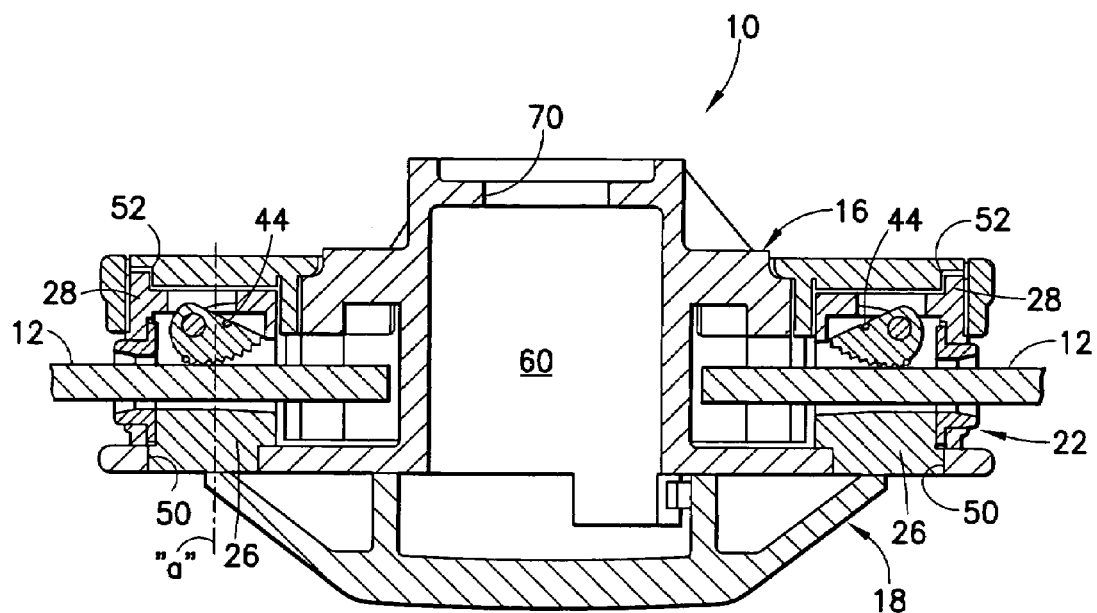
FIG. 4 is a cross-sectional view taken along lines 4-4 in FIG. 3.
Figure 5:
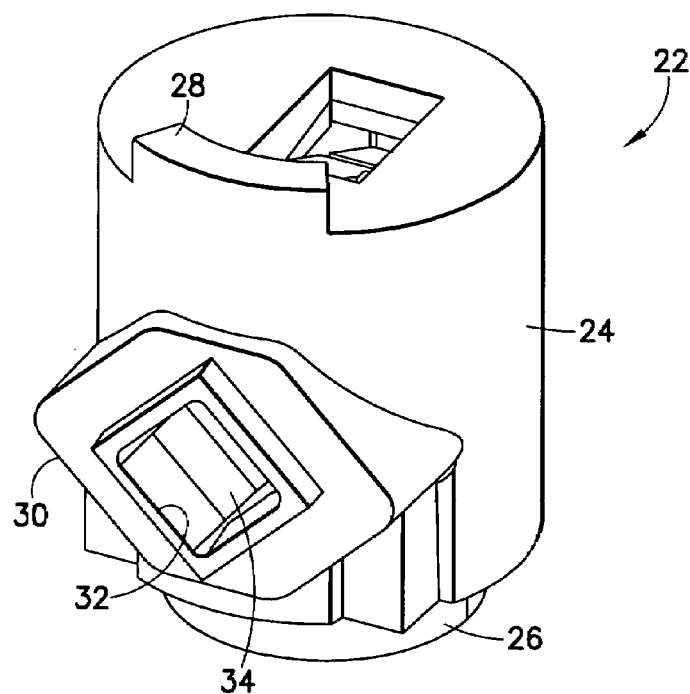
FIG. 5 is a perspective view of a rotatable housing which forms a part of the cutting head of the subject invention.
Figure 6:
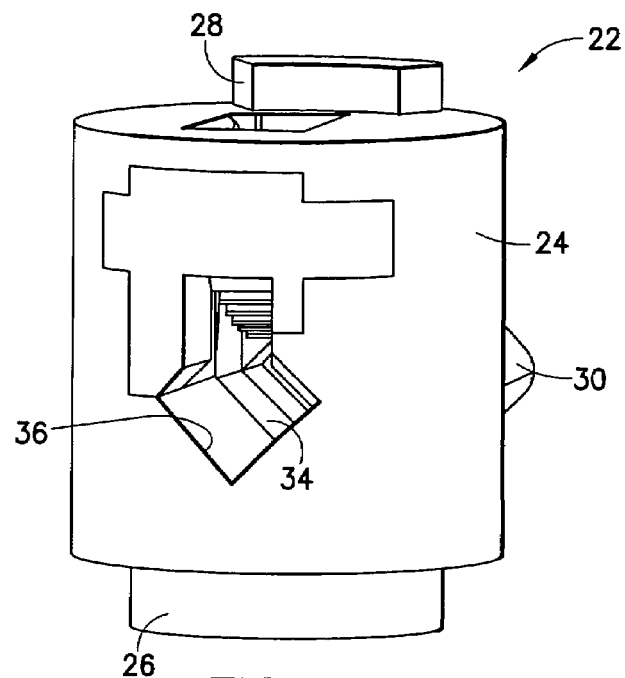
FIG. 6 is a perspective view of the rotatable housing of FIG. 5 taken from the opposite side thereof.

As illustrated in FIG. 4, each rotatable clamp housing 22 is mounted within the cutting head 10 with the circular support portion 26 being rotatably supported within circular opening 50 provided in the lower cover 18. The curved tang 28 of each rotatable clamp housing 22 is accommodated in a curved recess 52 within the upper cover 16, with the curved recess 52 extending about 180 degrees, thus enabling the rotatable clamp housing 22 to be rotated 90 degrees about axis "a" in either direction from the neutral position as shown in FIG. 1.

As in the case of applicant's trimmer head as disclosed in U.S. Pat. Nos. 5,758,424 and 5,896,666, the passageway 34 extends completely through the cylindrically shaped housing 24. Hence, should a string 12 be broken during operation of the cutter head 10, it can be readily pushed radially inwardly and through rear opening 36 to the central volume 60 within the cutter head 10 in order to extract the string 12 from the cutter head, and enable a new string 12 to be loaded into the trimmer head via opening 32.

The volume 60 which is radially inward of the rotatable clamp housings 22 enable the latter to be rotated through a range of 180 degrees, without the string 12 contacting the inner surface of the cutting head 10.

As illustrated in FIG. 4, the upper cover 16 includes drive shaft aperture 70 for receiving the drive shaft of a motor (not shown) for powering the cutter head.

During operation of the cutter head 10, a string 12 is inserted through opening 32 and through the passageway 34 and out of the rear opening 36. At such time, one end of the string 12 is engaged by the spring-biased clamping member 40 and is maintained in that position during rotation of the cutting head. The distal end of the string 12 which extends out of the rear opening 36 of the rotatable clamp housing 22 is disposed in the central volume 60 of the rotatable clamp housing 22. Hence, if a string 12 breaks during operation of the trimmer head, the operator turns off the machine and pulls on the radially inner distal end of the string 12 through volume 60 in order to remove the broken string preparatory to insertion of a new string 12 through the opening 32 in the protrusion 30.

As illustrated in FIGS. 4 and 10, spring-biased cam 42 is pivotally mounted about axis 46 that extends generally parallel to the planes of the upper and lower covers 16, 18. Cam 42 includes teeth 48 for gripping the cutting line 12, and for preventing the cutting line or string 12 from being pulled out of the rotatable clamping structure 22 through the diamond-shaped opening 32. The cam 42 is spring-biased and cooperates with the opposing pressing wall 34A (see FIG. 10) within the passageway 34 of the rotatable clamp housing 22 to clamp the string 12 within the clamp housing 22. Preferably, each cam 42 is pivotally mounted about generally horizontal axis 46 such that the center of gravity of the cam 42 is disposed between the pivot axis 46 and the pressing wall 34A. The construction and operation of cams 42 generally correspond to the operation of the cam structure in applicant's prior U.S. Pat. Nos. 5,758,424 and 5,896,666.

In operation, if a cutting string 12 should contact a rigid object, the rotatable clamp housing 22 would react by rotating about the circular support portion 26 within the circular opening 50, and the tang 28 would slide within the curved recessed opening 52 in the upper cover 16, with the rotation of the rotatable clamp housing 22 thereby minimizing the development of a stress concentration in or breaking of the string 12 in the region where the string engages the rotatable clamp housing 22.

Should a cutting line 12 be broken, it is merely necessary for the user to turn off the trimmer and rotate the rotatable clamp housing 22 in order to pull the broken string through the rear opening 36 and out through the volume 60.

Figure 12:
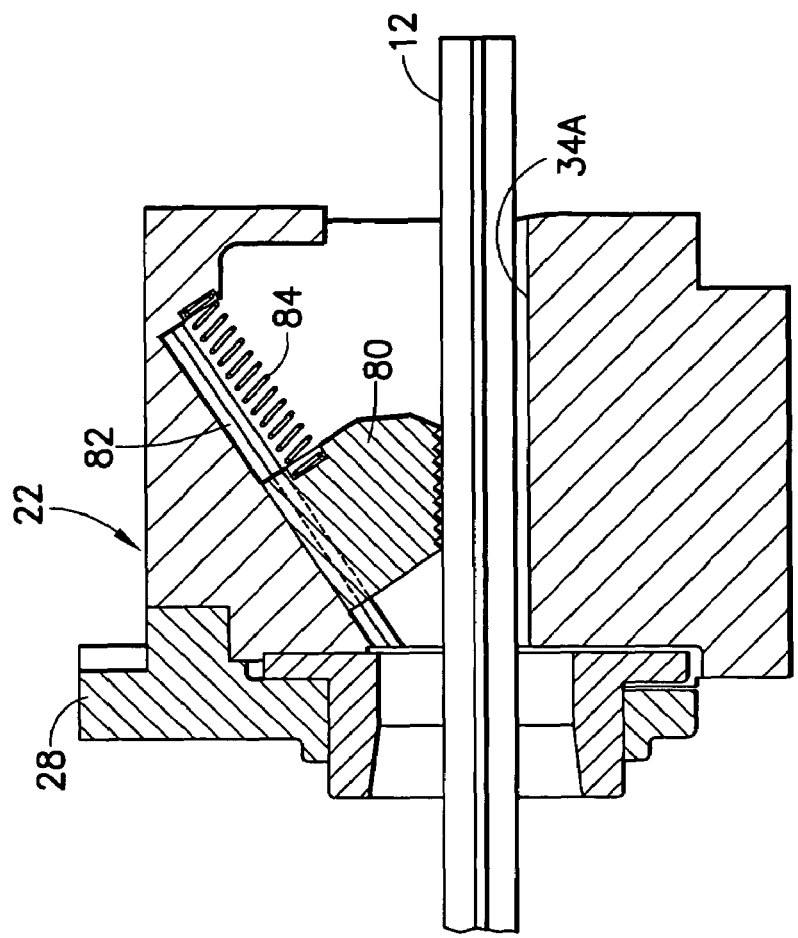
FIG. 12 is a cross-sectional view of the second embodiment of the rotatable housing of the subject invention taken along lines 12-12 in FIG. 11.
Figure 11:
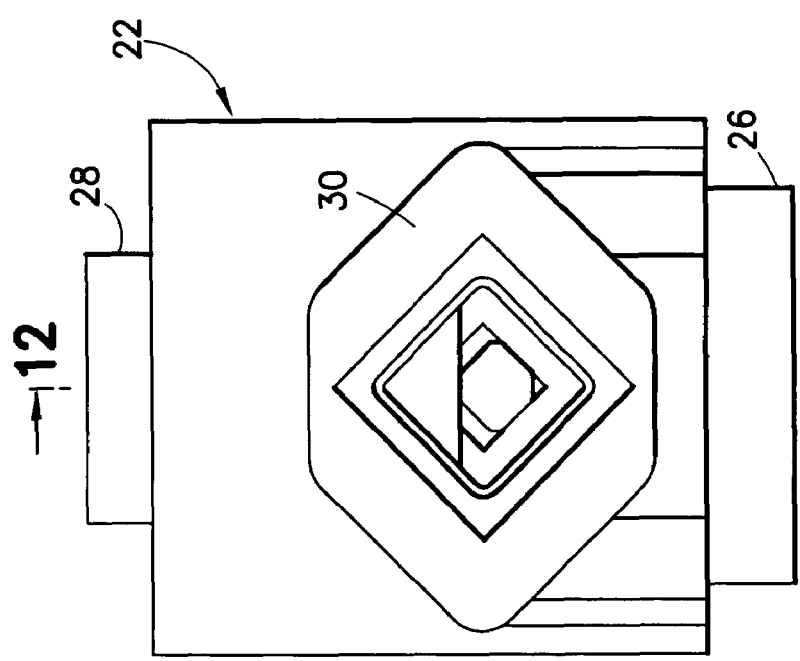
FIG. 11 is a front elevational view of a second embodiment of the rotatable housing of the subject invention.

FIGS. 11 and 12 illustrate an alternate embodiment of a clamping member disposed within the rotatable clamp housing 22. Instead of being pivotally mounted, the cam 80 is slidably mounted in a guide structure 82 and is biased by a compression spring 84 into engagement with the string 12.

Although the cutting head illustrated in FIGS. 1-10 includes four cutting strings 12, the subject cutting head may also be operated with only two diametrically opposed cutting strings.

As is readily apparent, numerous modifications and changes may readily occur to those skilled in the art and, hence, it is not desired to limit the invention to the exact construction and operation shown and described, and accordingly all suitable modification equivalents may be resorted to falling within the scope of the invention as claimed.

What is claimed is:

1. A combination of a cutting head and string for cutting and trimming vegetation, said combination being selectively rotationally driven through a drive shaft, said combination comprising:
   at least one generally straight length of string, each said string having two ends and an intermediate portion extending therebetween;
   a cutting head selectively rotationally driven by the drive shaft, said cutting head having generally planar, upper and lower covers which are spaced from one another, at least one clamp housing disposed between the spaced upper and lower covers and being rotatable relative to the covers about an axis extending generally perpendicular to the planar covers;
   each rotatable clamp housing having a through passageway for receiving one end of said string;
   a spring-biased clamping member disposed in said rotatable clamp housing for selectively fixing each said string to said head.

2. A combination of a cutting head and string for cutting and trimming vegetation as in claim 1, wherein the clamp housing is rotatable about an arc of 180 degrees.

3. A combination of a cutting head and string for cutting and trimming vegetation as in claim 1, wherein said upper cover includes an arcuate recess therein, and wherein said clamp housing includes a curved tang which is received in said arcuate recess for limiting the rotational movement of said clamp housing.

4. A combination of a cutting head and string for cutting and trimming vegetation as in claim 1, wherein said clamping member is formed as a cam, and wherein the cam is spring-biased by a torsion spring.

5. A combination of a cutting head and string for cutting and trimming vegetation as in claim 4, wherein said cam is pivotally mounted within the clamp housing, with the axis of the cam pivot being generally parallel to the upper and lower covers.

6. A combination of a cutting head and string for cutting and trimming vegetation as in claim 5, wherein the cam of the clamping member is formed with a center of gravity disposed between the pivotal mounting of the cam and a cooperating pressing wall of said through passageway.

7. A combination of a cutting head and string for cutting and trimming vegetation as in claim 1, wherein said spring-biased clamping member is slidably mounted within the clamp housing.

8. A combination of a cutting head and string for cutting and trimming vegetation as in claim 7, wherein the clamping member is biased by a compression spring.

9. A combination of a cutting head and string for cutting and trimming vegetation as in claim 1, wherein the upper and lower covers are maintained in spaced relationship by a plurality of posts connected thereto.

10. A combination of a cutting head and string for cutting and trimming vegetation as in claim 1, wherein said cutting head includes two diametrically opposed clamp housings, with the central portion of said cutting head defining a volume for receiving said first end of each said string.

* * * * *